United States Patent
Katsuta

(10) Patent No.: US 9,469,293 B2
(45) Date of Patent: Oct. 18, 2016

(54) VEHICLE AND CONTROL METHOD FOR VEHICLE

(75) Inventor: Hiroshi Katsuta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/357,646

(22) PCT Filed: Nov. 24, 2011

(86) PCT No.: PCT/JP2011/077025
§ 371 (c)(1),
(2), (4) Date: May 12, 2014

(87) PCT Pub. No.: WO2013/076836
PCT Pub. Date: May 30, 2013

(65) Prior Publication Data
US 2015/0057857 A1  Feb. 26, 2015

(51) Int. Cl.
*B60W 20/10* (2016.01)
*B60W 30/18* (2012.01)
(Continued)

(52) U.S. Cl.
CPC .......... *B60W 20/1062* (2013.01); *B60K 6/445* (2013.01); *B60L 7/10* (2013.01); *B60W 10/08* (2013.01); *B60W 10/188* (2013.01); *B60W 20/00* (2013.01); *B60W 20/14* (2016.01); *B60W 30/18127* (2013.01); *F01N 3/2013* (2013.01); *B60W 2510/244* (2013.01); *B60W 2530/12* (2013.01); *B60Y 2300/474* (2013.01);
(Continued)

(58) Field of Classification Search
CPC ..... B60L 7/10; B60W 10/08; B60W 10/188; B60W 30/18127; B60W 20/1062; F01N 3/2013

USPC .......... 701/22; 180/65.265; 903/930
See application file for complete search history.

(56) References Cited

U.S. PATENT DOCUMENTS 6,086,166 A  7/2000 Fukasawa
2003/0080614 A1  5/2003 Soga
(Continued)

FOREIGN PATENT DOCUMENTS

DE  102010004436 A1  7/2011
JP  A-10-238381  9/1998
(Continued)

OTHER PUBLICATIONS

English translation of jp2004360289a1.*
(Continued)

*Primary Examiner* — Fadey Jabr
*Assistant Examiner* — Yazan Soofi
(74) *Attorney, Agent, or Firm* — Oliff PLC

(57) ABSTRACT

In a vehicle capable of performing regenerative braking by a motor, when regenerative power is supplied to both of a battery and an electric heating catalyst device (EHC), and it is predicted that the battery is overcharged at the time of turning-off of EHC (a supply of power to the EHC is stopped), ECU temporarily delays turning-off of EHC. ECU determines whether or not a condition for turning off the EHC is met during the EHC turning-off delay. When the condition for turning off the EHC is met, the regenerative brake torque is lowered so that the regenerative power becomes less than the battery acceptable power, and the hydraulic brake torque is increased depending on lowering of the regenerative brake torque, and thereafter the EHC turning-off delay is cancelled.

8 Claims, 6 Drawing Sheets

(51) Int. Cl.
*B60W 10/188* (2012.01)
*B60W 10/08* (2006.01)
*F01N 3/20* (2006.01)
*B60W 20/00* (2016.01)
*B60K 6/445* (2007.10)
*B60L 7/10* (2006.01)

(52) U.S. Cl.
CPC ............. *Y02T10/26* (2013.01); *Y02T 10/6239* (2013.01); *Y02T 10/84* (2013.01); *Y10S 903/93* (2013.01)

(56) References Cited

U.S. PATENT DOCUMENTS

| | | | |
|---|---|---|---|
| 2003/0172643 A1* | 9/2003 | Suzuki | 60/284 |
| 2004/0231897 A1 | 11/2004 | Kimura et al. | |
| 2009/0159351 A1* | 6/2009 | Ando et al. | 180/65.265 |
| 2011/0125351 A1 | 5/2011 | Bauerle | |
| 2013/0324363 A1* | 12/2013 | Hashimoto | 477/100 |
| 2014/0000245 A1* | 1/2014 | Harada et al. | 60/286 |

FOREIGN PATENT DOCUMENTS

| | | | |
|---|---|---|---|
| JP | A-11-004503 | | 1/1999 |
| JP | A-2003-127721 | | 5/2003 |
| JP | A-2004-245135 | | 9/2004 |
| JP | 2004360289 A1 | * | 12/2004 |
| JP | A-2005-002989 | | 1/2005 |
| JP | 2006174543 | * | 6/2006 |
| JP | A-2009-189921 | | 8/2009 |
| JP | A-2009-214703 | | 9/2009 |
| JP | A-2011-167030 | | 8/2011 |

OTHER PUBLICATIONS

English translation of JP 2006-174543.*

* cited by examiner

VEHICLE AND CONTROL METHOD FOR VEHICLE

TECHNICAL FIELD

The present invention relates to a technology of consuming regenerative power of a motor in a vehicle capable of performing regenerative braking by a motor.

BACKGROUND ART

Japanese Patent Laying-Open No. 2011-167030 (PTD 1) discloses a technology of allowing a motor to operate as a generator at a time of braking to have the motor generate regenerative power and charging a vehicle-mounted battery with the generated regenerative power in a hybrid vehicle which runs with motive power of an engine and a motor.

CITATION LIST

Patent Document

PTD 1: Japanese Patent Laying-Open No. 2011-167030
PTD 2: Japanese Patent Laying-Open No. 2004-245135
PTD 3: Japanese Patent Laying-Open No. 2009-214703
PTD 4: Japanese Patent Laying-Open No. 10-238381
PTD 5: Japanese Patent Laying-Open No. 2005-2989
PTD 6: Japanese Patent Laying-Open No. 2009-189921

SUMMARY OF INVENTION

Technical Problem

Acceptable power of a battery is lowered depending on a temperature and a state of charge of the battery. However, at a time of charging a battery with regenerative power as disclosed in PTD 1, when the regenerative power exceeds the acceptable power of the battery, there is a possibility that the battery is deteriorated by going into an overcharged state. When the regenerative power is rapidly reduced to prevent the deterioration of the battery, brake torque of the vehicle is rapidly reduced to possibly give a sense of discomfort to a user (degrade drivability).

The present invention was achieved to solve the problem described above, and its object is to accomplish both suppression of battery overcharging and suppression of degradation in drivability while effectively utilizing regenerative power of a motor in a vehicle capable of performing regenerative braking by a motor.

Solution to Problem

A vehicle according to the present invention includes a motor coupled to drive wheels, a power storage device providing and receiving power to and from the motor, an engine, a catalyst device, which is heated by power supplied from a power line connecting the motor and the power storage device, for purifying exhaust gas of the engine, a hydraulic brake device for applying hydraulic brake torque to the drive wheels, and a control device for controlling the motor and the hydraulic brake device. When regenerative power generated by regenerative power generation of the motor is supplied to both of the power storage device and the catalyst device, and when a stopping condition for stopping a supply of power to the catalyst device is met, the control device substitutes the hydraulic brake torque for at least a part of regenerative brake torque obtained by the regenerative power generation.

Preferably, the stopping condition includes a first stopping condition for stopping a supply of power to the catalyst device in a near future. When the regenerative power is supplied to the both of power storage device and catalyst device, and when the first stopping condition is met, the control device performs a first substitute control of gradually lowering the regenerative brake torque at a change rate less than a predetermined change rate and gradually increasing the hydraulic brake torque depending on lowering of the regenerative brake torque before a supply of power to the catalyst device is stopped.

Preferably, when the regenerative power is supplied to the both of power storage device and catalyst device, and before the first stopping condition is met, the control device controls the regenerative brake torque so that the regenerative power becomes less than a total value of acceptable power of the power storage device and consumed power of the catalyst device. The first substitute control is a control of lowering the regenerative brake torque until the regenerative power becomes less than acceptable power of the power storage device and increasing the hydraulic brake torque by a lowered amount of the regenerative brake torque.

Preferably, the stopping condition includes a second stopping condition for stopping a supply of power to the catalyst device immediately. When the regenerative power is supplied to the both of power storage device and catalyst device, and when the second stopping condition is met, the control device performs a second substitute control of lowering the regenerative brake torque immediately at a change rate higher than or equal to a predetermined change rate and increasing the hydraulic brake torque depending on lowering of the regenerative brake torque.

Preferably, when the regenerative power is supplied to the both of power storage device and catalyst device, and before the second stopping condition is met, the control device controls the regenerative brake torque so that the regenerative power becomes less than a total value of acceptable power of the power storage device and consumed power of the catalyst device. The second substitute control is a control of lowering the regenerative brake torque until the regenerative power becomes zero and increasing the hydraulic brake torque by a lowered amount of the regenerative brake torque.

Preferably, when the regenerative power is supplied to the both of power storage device and catalyst device, and before the stopping condition is met, the control device determines distribution of the regenerative brake torque and the hydraulic brake torque based on acceptable power of the power storage device and consumed power of the catalyst device.

Preferably, the control device determines the regenerative brake torque so that the regenerative power becomes less than or equal to a total value of acceptable power of the power storage device and consumed power of the catalyst device, and the control device sets a torque exceeding the regenerative brake torque in the user-requested brake torque as the hydraulic brake torque.

A control method according to another aspect of the present invention is a control method for a vehicle. The vehicle includes a motor coupled to drive wheels, a power storage device providing and receiving power to and from the motor, an engine, a catalyst device, which is heated by power supplied from a power line connecting the motor and the power storage device, for purifying exhaust gas of the engine, a hydraulic brake device for applying hydraulic brake torque to the drive wheels, and a control device for controlling the motor and the hydraulic brake device. The control method includes the steps of determining whether or not regenerative power generated by regenerative power generation of the motor is supplied to both of the power storage device and the catalyst device, and when the regenerative power is supplied to the both of power storage device and catalyst device, and when a condition for stopping a supply of power to the catalyst device is met, substituting the hydraulic brake torque for at least a part of regenerative brake torque obtained by the regenerative power generation.

Advantageous Effects of Invention

According to the present invention, in a vehicle capable of performing regenerative braking by a motor, suppression of battery overcharging and suppression of degradation in drivability can be accomplished while effectively utilizing regenerative power of the motor.

DESCRIPTION OF EMBODIMENT

Figure 1:
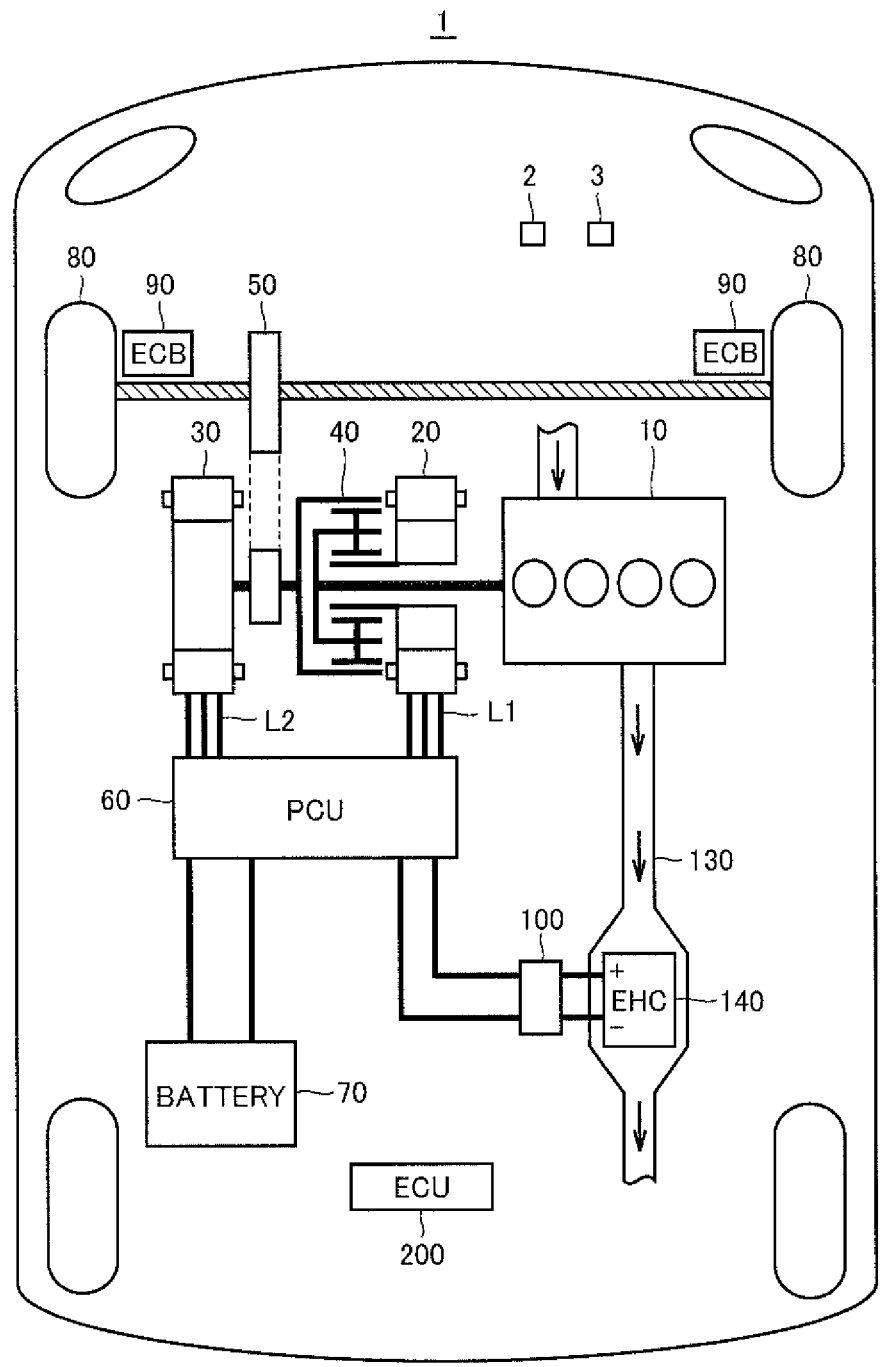
FIG. 1 is an overall block diagram of a vehicle.

Hereinafter, an embodiment of the present invention will be described in detail with reference to the drawings. In the drawings, the same or corresponding parts have the same reference numerals allotted, and description thereof will not be repeated.

FIG. 1 is an overall block diagram of a vehicle 1 according to the present embodiment. Vehicle 1 includes an engine 10, a first MG (Motor Generator) 20, a second MG 30, a motive power split device 40, a reducer 50, a PCU (Power Control Unit) 60, a battery 70, drive wheels 80, an ECB (Electronically Controlled Brake System) 90, and an ECU (Electronic Control Unit) 200.

Engine 10, first MG 20, and second MG 30 are coupled via motive power split device 40. Vehicle 1 is a hybrid vehicle which runs with use of driving power from at least one of engine 10 and second MG 30. A driving method of vehicle 1 may be other than the hybrid method.

Engine 10 is an internal combustion engine which generates driving power for rotating a crank shaft with use of combustion energy generated at a time of combusting a mixture of air and fuel. Engine 10 is controlled by a control signal from ECU 200. The motive power generated by engine 10 is split by motive power split device 40 into a path for transmission to drive wheels 80 and a path for transmission to first MG 20.

First MG 20 and second MG 30 are motor generators driven by an alternate current.

First MG 20 generates power with use of the motive power of engine 10 split by motive power split device 40. The power generated by first MG 20 is supplied to battery 70 and second MG 30.

Second MG 30 generates driving power with use of at least one of power supplied from battery 70 and power generated by first MG 20. Then, the driving power of second MG 30 is transmitted to drive wheels 80. At a time of braking of vehicle 1, second MG 30 is driven by drive wheels 80, and second MG 30 operates as a generator. Accordingly, second MG 30 serves as a regenerative brake which converts motion energy of vehicle 1 into electric energy. The regenerative power generated by regenerative power generation of second MG 30 is charged in battery 70 via PCU 60. Further, as will be described in detail later, the regenerative power is supplied also to EHC 140 as needed.

Motive power split device 40 is composed of planetary gears including a sun gear, a pinion gear, a carrier, and a ring gear. The pinion gear engages with the sun gear and the ring gear. The carrier rotatably supports the pinion gear and is coupled to a crankshaft of engine 10. The sun gear is coupled to a rotational shaft of first MG 20. The ring gear is coupled to a rotational shaft of second MG 30 and to reducer 50. As described above, engine 10, first MG 20, and second MG 30 are coupled through motive power split device 40 composed of planetary gears, so that a rotational speed of engine 10, a rotational speed of first MG 20, and a rotational speed of second MG 30 are in a linear relationship connected by a straight line in a collinear graph of motive power split device 40 (the relationship in which setting any two values determines remaining one value).

PCU 60 is controlled by a control signal from ECU 200. PCU 60 converts direct-current power supplied from battery 70 into alternate-current power capable of driving first MG 20 and second MG 30. PCU 60 outputs the converted alternate-current power to first MG 20 and second MG 30 respectively. Accordingly, first MG 20 and second MG 30 are driven with use of power stored in battery 70. PCU 60 can also convert alternate-current power generated by first MG 20 and second MG 30 into direct-current power and charge battery 70 with use of the converted direct-current power.

Battery 70 is a direct-current power supply which stores power for driving first MG 20 and second MG 30, and is composed of, for example, a rechargeable battery of nickel-metal hydride, lithium-ion, or the like. An output voltage of battery 70 is, for example, a high voltage beyond 200V. In place of battery 70, a high-capacity capacitor is also employable.

ECB 400 causes hydraulic brake torque to be applied to drive wheels 80 in response to a control signal from ECU 200. A structure of ECB 400 itself may be the same as the conventional structure. Although not illustrated in the drawings, ECB 400 causes hydraulic brake torque to be applied not only to drive wheels 80 but also to driven wheels (rear wheels in FIG. 1).

Further, vehicle 1 includes a position sensor 2 and a stroke sensor 3. Position sensor 2 detects an accelerator pedal operation amount A by a user. Stroke sensor 3 detects a brake pedal operation amount B by a user. Each of these sensors transmits a signal representing a detection result to ECU 200.

Further, vehicle 1 includes an exhaust gas passage 130. Exhaust gas discharged from engine 10 is emitted to atmosphere through exhaust gas passage 130.

On exhaust gas passage 130, an electrically heated catalyst (hereinafter, referred to as "EHC") 140 is provided. EHC 140 is a catalyst has a configuration capable of electrically heating a catalyst by means of an electric heater (an electric resistor which converts electric energy into heat energy). EHC 140 has a function of consuming a large amount of power to raise the temperature of the catalyst to a high temperature. Specifically, EHC 140 includes an electric heater which generates heat by consuming power boosted by a converter 61 (for example, direct-current power of about 650 volts), and raises the temperature of the catalyst to a high temperature by means of this electric heater. Various known types of EHC 140 may be employed.

Figure 2:
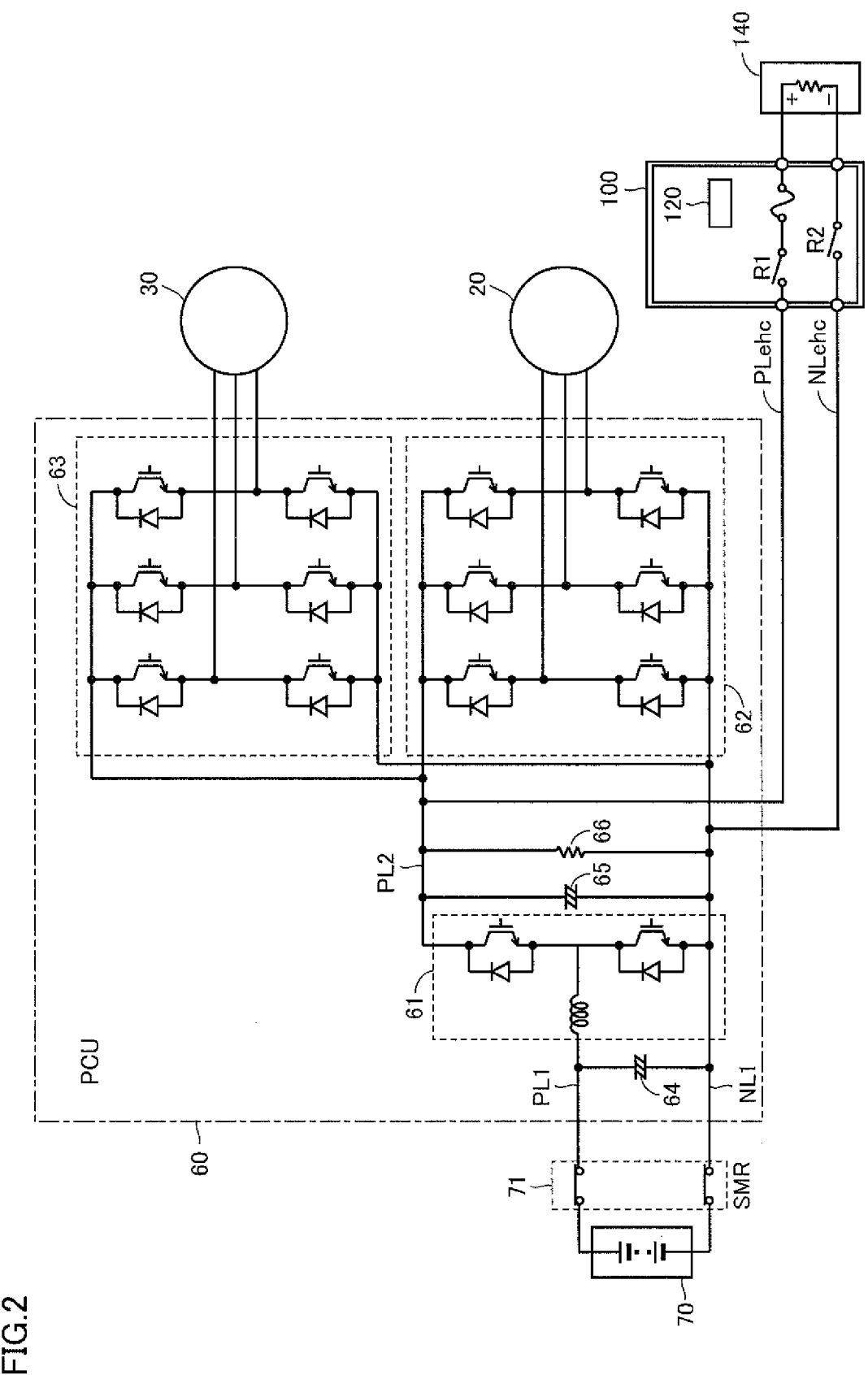
FIG. 2 represents a circuit configuration of a first MG, a second MG, a PCU, a battery, and an EHC.

FIG. 2 represents a circuit configuration of first MG 20, second MG 30, PCU 60, battery 70, and EHC 140.

Between PCU 60 and battery 70, a system main relay (SMR) 71 is provided. SMR 71 is controlled by a control signal from ECU 200, and switches supply and cutoff of power between battery 70 and PCU 60.

PCU 60 includes a converter 61, inverters 62, 63, smoothing capacitors 64, 65, and a discharge resistor 66.

Converter 61 is connected to battery 70 though a positive line PL1 and a negative line NL1. Further, converter 61 is connected to inverters 62, 63 though a positive line PL2 and a negative line NL1.

Converter 61 includes a reactor, two switching elements, and two diodes. Converter 61 is controlled by a control signal from ECU 200, and performs voltage conversion between battery 70 and inverters 62, 63.

Inverter 62 is provided between converter 61 and first MG 20. Inverter 63 is provided between converter 61 and second MG 30. Inverters 62, 63 are in parallel connection with converter 61 each other.

Each of inverters 62, 63 includes three-phase upper and lower arms (switching elements), and a diode connected in inverse-parallel with each switching element. The upper and lower arms of each of inverters 62, 63 are controlled by a control signal from ECU 200, convert direct-current power subjected to voltage conversion in converter 61 into alternate-current power, and output the power to first MG 20 and second MG 30 respectively.

Smoothing capacitor 64 is connected between positive line PL1 and negative line NL1 to a smooth alternate-current component of voltage fluctuation between positive line PL1 and negative line NL1. Smoothing capacitor 65 is connected between positive line PL2 and negative line NL1 to smooth an alternate-current component of voltage fluctuation between positive line PL2 and negative line NL1.

Discharge resistor 66 is connected between positive line PL2 and negative line NL1. Discharge resistor 66 is used for extracting a residual electric charge of smoothing capacitors 64, 65. Therefore, a capacity of discharge resistor 66 (an amount of power which can be consumed per unit time) is smaller as compared to EHC 140.

EHC 140 is connected to power lines (positive line PL2 and negative line NL1) between converter 61 and inverters 62, 63. More specifically, one end of the electric heater provided in EHC 140 is connected to a positive branch line PLehc branching out from positive line PL2, and the other end is connected to a negative branch line NLehc branching out from negative line NL1. Accordingly, EHC 140 is heated by power supplied from positive line PL2. In other words, EHC 140 heated by consuming power brought after boosting the power of battery 70 with use of converter 61. As described above, battery 70 and converter 61 according to the present embodiment are used not only as a hybrid power supply (a power supply for driving second MG 30) but also as an EHC power supply (a power supply for heating EHC 140). Further, at the time of braking of vehicle 1, EHC 140 is heated also by consuming regenerative power generated by first MG 20 and/or second MG 30 (more accurately, the power brought by converting the regenerative power into direct-current power at inverters 62, 63).

Between EHC 140 and PCU 60, a switching device 100 is provided. Switching device 100 includes at its inside an EHC relay R1 provided on positive branch line PLehc, an EHC relay R2 provided on negative branch line NLehc, and a monitoring sensor 120 which monitors states of EHC 140 and EHC relays R1, R2. Monitoring sensor 120 calculates consumed power of EHC 140 (hereinafter, also referred to as "EHC consumed power Pehc"), an estimated temperature of EHC 140, an electric resistance value of EHC 140, and the like from a voltage value and a current value supplied to EHC 140, and outputs a calculation result to ECU 200. All or a part of the functions of monitoring sensor 120 may be provided outside of switching device 100.

Opening/closing (on/off) of each of EHC relays R1, R2 is controlled by a control signal from ECU 200. When both of EHC relays R1, R2 are closed (hereinafter, this state will be also referred to as "turning-on of EHC"), EHC 140 and PCU 60 are electrically connected, so power is supplied to EHC 140. This turning-on of EHC causes the catalyst in EHC 140 to be warmed up. On the other hand, when at least one of EHC relays R1, R2 is opened (hereinafter, this state will be also referred to as "turning-off of EHC"), an electrical connection between EHC 140 and PCU 60 is cut off, so that a supply of power to EHC 140 is stopped. As described above, the supply and stopping of power to EHC 140 can be switched with a relatively simple and inexpensive configuration of controlling opening/closing of EHC relays R1, R2 by means of ECU 200.

Referring back to FIG. 1, ECU 200 includes a CPU (Central Processing Unit) and a memory, which are not illustrated in the drawings, and is configured to execute a predetermined computation processing based on information stored in the memory. In FIG. 1, ECU 200 is shown as a single unit. However, ECU 200 may be divided into two or more units.

ECU 200 sets a battery acceptable power WIN (unit is Watt) depending on a state of charge (SOC) and a temperature of battery 70 and controls PCU 60 so that power actually accepted by battery 70 (hereinafter, referred to as "battery accepted power Pin" (unit is Watt)) does not exceed battery acceptable power WIN. Accordingly, overcharging of battery 70 is suppressed, and deterioration of battery 70 is suppressed.

In vehicle 1 having such a structure as described above, by controlling second MG 30 to perform regenerative power generation when for example a user steps on a brake pedal to request reduction of speed of vehicle 1, second MG 30 can serve as a regenerative brake. By charging battery 70 with the regenerative energy generated in second MG 30 at this time, the motion energy of vehicle 1 can be collected as electric energy.

When regenerative power (unit is Watt) exceeds battery acceptable power WIN at a time of charging battery 70 with the regenerative energy, there arises a problem of how to consume surplus power exceeding battery acceptable power WIN. In the present embodiment, EHC relays R1, R2 are closed to supply the regenerative power to both of battery 70 and EHC 140, so that a part of the regenerative power including the surplus power can be effectively used as energy for heating the EHC. Accordingly, the motion energy of vehicle 1 can be collected efficiently without wasteful consumption while suppressing overcharging of battery 70.

However, when the regenerative power generation by second MG 30 continues for a relatively long time, for example, on a long downward slope, it is assumed that EHC 140 goes into an overheated state. If a supply of power to EHC 140 is immediately stopped at one point of time to avoid overheating of EHC 140, an overcharged state may occur in which power exceeding battery acceptable power WIN is supplied to battery 70, thus it may affect duration of battery 70. If the regenerative power is rapidly reduced to prevent this overcharging, a lowered amount of regenerative brake torque by second MG 30 must be instantly substituted by hydraulic brake torque by ECB 90. Consequently, a sense of discomfort is possibly given to a user (drivability may be degraded).

Further, in the present embodiment, as described above, battery 70 and converter 61 are shared as a hybrid power supply and an EHC power supply, thus a battery and a converter dedicated for the EHC are not provided. Therefore, it is not possible to accurately and continuously lower only the amount of power supplied to EHC 140.

Therefore, when vehicle 1 performs regenerative braking in the turned-on state of the EHC (in other words, the regenerative power is supplied to both of battery 70 and EHC 140), and a condition for stopping a supply of power to EHC 140 (a condition for applying the turning-off of EHC) is met, ECU 200 according to the present embodiment temporarily delays the turning-off of EHC, and substitutes the hydraulic braking by ECB 90 for the regenerative braking during the delay of the turning-off of EHC. Then, ECU 200 cancels the delay of the turning-off of EHC (permits the turning-off of EHC) after the substitution from the regenerative braking to the hydraulic braking is completed. Accordingly, both suppression of battery overcharging and suppression of degradation in drivability (suppression of rapid reduction in the brake torque of vehicle 1) can be accomplished while effectively utilizing the regenerative power of second MG 30. This is the most characterizing point of the present invention.

Figure 3:
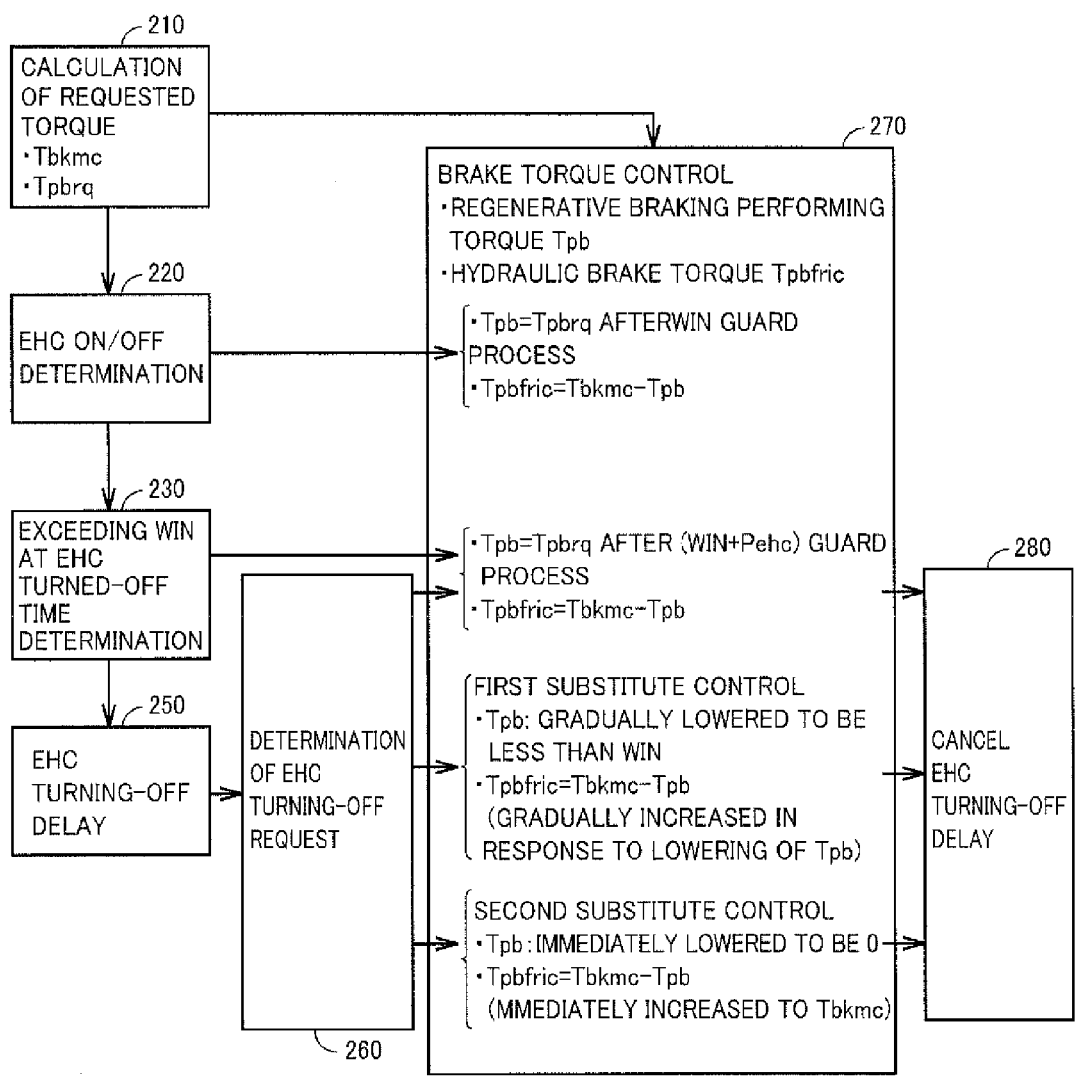
FIG. 3 is a functional block diagram of the ECU.

FIG. 3 is a functional block diagram of ECU 200. Each functional block shown in FIG. 3 may be achieved by either hardware or software.

ECU 200 includes a requested torque calculating unit 210, determination units 220, 230, 260, an EHC turning-off delay unit 250, a brake torque controller 270, and an EHC turning-off delay cancelling unit 280.

Requested torque calculating unit 210 calculates a user-requested brake torque Tbkmc based on a brake pedal operation amount B and the like from a stroke sensor 3. Then, requested torque calculating unit 210 calculates regenerative requested brake torque Tpbrq within a range not beyond user-requested brake torque Tbkmc.

Determination unit 220 performs EHC on/off determination. Specifically, determination unit 220 determines either the EHC turned-on state or the EHC turned-off state.

When the EHC is in the turned-on state, determination unit 230 performs exceeding WIN at EHC turned-off time determination. The exceeding WIN at EHC turned-off time determination is a process of determining whether or not battery accepted power Pin is predicted to exceed battery acceptable power WIN when the turning-off of EHC is present. For example, determination unit 230 predicts "exceeding WIN at EHC turned-off time (Pin>WIN during the turning-off of EHC)" when regenerative requested brake torque Tpbrq is greater than the regenerative brake torque which is provided when second MG 30 generates regenerative power corresponding to battery acceptable power WIN (hereinafter, referred to as "battery-allowable torque Twin").

EHC turning-off delay unit 250 performs an EHC turning-off delay process when it is predicted that "exceeding WIN at EHC turned-off time" is present. The EHC turning-off delay process is a process of temporarily delaying the turning-off of EHC. For example, EHC turning-off delay unit 250 outputs an instruction for performing the EHC turning-off delay to the EHC controller not illustrated in the drawings. Accordingly, the turning-off of the EHC is temporarily delayed.

After the EHC turning-off delay process is performed, determination unit 260 determines whether or not the condition for turning off the EHC is met. Specifically, determination unit 260 determines presence of "EHC turning-off notice" and presence of "EHC immediate turning-off request".

The "EHC turning-off notice" gives a notice that the EHC will be turned off in a near future (after an elapse of a predetermined time) to avoid an overheated state of EHC 140. For example, the "EHC turning-off notice" is outputted when the EHC controller not illustrated in the drawing predicts that an EHC temperature after an elapse of the predetermined time exceeds an allowable temperature based on an estimated temperature and a consumed power amount of EHC 140.

On the other hand, the "EHC immediate turning-off request" is a request for immediately turning off the EHC. For example, the "EHC immediate turning-off request" is outputted when the EHC controller not illustrated in the drawings determines that a supply of power to EHC 140 cannot be performed in a normal way. The examples of the case where the supply of power to EHC 140 cannot be performed in a normal way may include the case where a circuit and wiring for supplying power to EHC 140 are failed, the case where an electric resistance of EHC 140 rises higher than a normal value due to an internal damage of EHC 140, the case where EHC consumed power Pehc becomes zero, the case where a reduction rate of EHC consumed power Pehc exceeds a reference value, and the like.

Brake torque controller 270 sets regeneration performing brake torque Tpb and hydraulic brake torque Tpbfric so as to achieve user-requested brake torque Tbkmc. Then, brake torque controller 270 outputs an instruction for setting actual regenerative brake torque to regeneration performing brake torque Tpb to second MG 30 (more accurately, inverter 63 provided in PCU 63), and outputs an instruction of setting actual hydraulic brake torque to hydraulic brake torque Tpbfric.

Brake torque controller 270 changes a way of setting regeneration performing brake torque Tpb and hydraulic brake torque Tpbfric depending on a determination results of determination units 220, 230, 260.

When the EHC is in the turned-off state, brake torque controller 270 sets regeneration performing brake torque Tpb a value obtained after applying a WIN guard process to regenerative requested brake torque Tpbrq, and sets hydraulic brake torque Tpbfric a value obtained by subtracting regeneration performing brake torque Tpb from user-requested brake torque Tbkmc (=Tbkmc−Tpb).

Herein, the "WIN guard process" is a process of limiting an upper limit of regeneration performing brake torque Tpb so that the regenerative power becomes less than battery acceptable power WIN. In the present embodiment, regenerative requested brake torque Tpbrq is directly set to regeneration performing brake torque Tpb when regenerative requested brake torque Tpbrq is smaller than the above-described battery-allowable torque Twin. However, when regenerative requested brake torque Tpbrq is greater than battery-allowable torque Twin, battery-allowable torque Twin rather than regenerative requested brake torque Tpbrq is set to regeneration performing brake torque Tpb. Accordingly, battery accepted power Pin is prevented from exceeding battery acceptable power WIN (overcharging of battery).

When the EHC is in the turned-on state, and before at least any one of the "EHC turning-off notice" and the "EHC immediate turning-off request" is outputted, brake torque controller 270 determines distribution of regeneration performing brake torque Tpb and hydraulic brake torque Tpbfric using battery acceptable power WIN and EHC consumed power Pehc. Specifically, brake torque controller 270 sets regeneration performing brake torque Tpb to a value obtained by applying a (WIN+Pehc) guard process to regenerative requested brake torque Tpbrq, and sets a torque exceeding regeneration performing brake torque Tpb in user-requested brake torque Tbkmc as hydraulic brake torque Tpbfric.

Herein, the "(WIN+Pehc) guard process" is a process of limiting an upper limit of regeneration performing brake torque Tpb so that the regenerative power becomes less than a total value of battery acceptable power WIN and EHC consumed power Pehc. In the present embodiment, when regenerative requested brake torque Tpbrq is smaller than a total value of regenerative brake torque, which is provided at the time when second MG 30 generates regenerative power corresponding to a minimum value Pehc_min of the EHC consumed power (hereinafter, referred to as "EHC allowable torque Tehc_min"), and battery-allowable torque Twin, regenerative requested brake torque Tpbrq is directly set to regenerative requested brake torque Tpbrq. However, when regenerative requested brake torque Tpbrq is greater than a total value of EHC allowable torque Tpehc_min and battery-allowable torque Twin, the total value of EHC allowable torque Tpehc_min and battery-allowable torque Twin is set to regeneration performing brake torque Tpb. Accordingly, surplus power exceeding battery acceptable power WIN can be effectively used as energy for heating the EHC while allowing generation of regenerative power (=WIN+Pehc_min) exceeding battery acceptable power WIN. Accordingly, while suppressing overcharging of battery 70, motion energy of vehicle 1 can be collected efficiently without wasteful consumption.

It should be noted that "minimum value Pehc_min of EHC consumed power" rather than EHC consumed power Pehc itself is used in the (WIN+Pehc) guard process for the purpose of not allowing battery accepted power Pin to exceed acceptable power WIN even when EHC consumed power Pehc is lowered, taking into consideration the fluctuation of EHC consumed power Pehc depending on the state of EHC 140. Minimum value Pehc_min of EHC consumed power may be a value which is set based on a history of EHC consumed power Pehc from a monitoring sensor 120, or a value which is set in advance by experiment or the like. It should be noted that, as long as actual EHC consumed power Pehc can be measured point by point accurately using a sensor, measured EHC consumed power Pehc itself may be used.

When the EHC is in the turned-on state, and an "EHC turning-off notice" is given which exhibits a relatively low degree of urgency in stopping a supply of power to EHC 140, brake torque controller 270 gradually (moderately) lowers regeneration performing brake torque Tpb so that the regenerative power becomes less than battery acceptable power WIN, and gradually increases hydraulic brake torque Tpbfric depending on lowering of regeneration performing brake torque Tpb (hereinafter, such a control will be also referred to as a "first substitute control"). For example, brake torque controller 270 gradually lowers regeneration performing brake torque Tpb to be less than battery-allowable torque Twin at a change rate less than a predetermined change rate and obtains hydraulic brake torque Tpbfric of (Tbkmc−Tpb). Accordingly, during the EHC turning-off delay (before the EHC is turned off), and until the regenerative power becomes less than battery acceptable power WIN, regeneration performing brake torque Tpb moderately substitutes for hydraulic brake torque Tpbfric. Accordingly, the regenerative power can be lowered to be less than battery acceptable power WIN without giving a sense of discomfort to a user.

When the EHC is in the turned-on state, and an "EHC immediate turning-off request" is given which exhibits a relatively high degree of urgency in stopping a supply of power to EHC 140, brake torque controller 270 immediately lowers regeneration performing brake torque Tpb at a change rate higher than or equal to a predetermined change rate so that the regenerative power becomes zero (immediately abort regenerative power generation of second MG 30), and increases hydraulic brake torque Tpbfric by the lowered amount of regeneration performing brake torque Tpb. Accordingly, the regenerative power generation is immediately aborted, and the regenerative power is not supplied to battery 70, so that overcharging of the battery is suppressed.

In the second substitute control, since regeneration performing brake torque Tpb rapidly substitutes for hydraulic brake torque Tpbfric, a delay may occur in increasing the actual hydraulic brake torque, so that there is a possibility that a sense of discomfort is given to a user to some extent. However, taking into consideration the urgency, a priority is given to suppression of battery overcharging over suppression of degradation in drivability.

EHC turning-off delay cancelling unit 280 performs a process of cancelling the EHC turning-off delay when the first substitute control or the second substitute control is completed during the EHC turning-off delay. Accordingly, the turning-off of EHC is allowed.

Figure 4:
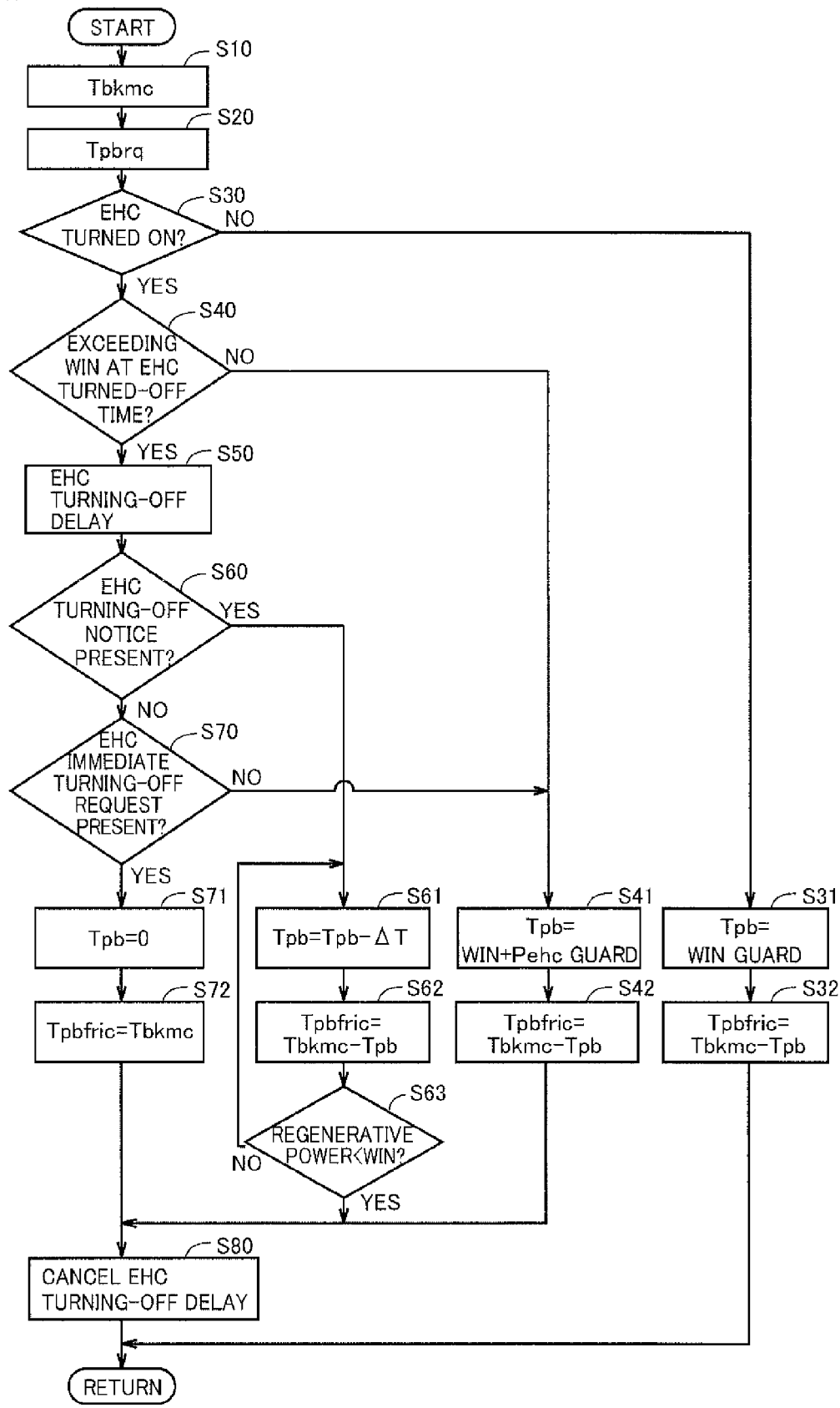
FIG. 4 is a flowchart representing process procedures of the ECU.

FIG. 4 is a flowchart representing process procedures for achieving the above-described functions of ECU 200.

In step (hereinafter, the step is abbreviated to "S") 10, ECU 200 calculates user-requested brake torque Tbkmc. In S20, ECU 200 calculates regenerative requested brake torque Tpbrq. In S30, ECU 200 determines whether or not the EHC is in the turned-on state.

When the EHC is in the turned-off state (NO in S30), ECU 200 sets in S31 a value obtained by applying the WIN guard process to regenerative requested brake torque Tpbrq to regeneration performing brake torque Tpb, and sets in S32 a value obtained by subtracting regeneration performing brake torque Tpb from user-requested brake torque Tbkmc (=Tbkmc−Tpb) to hydraulic brake torque Tpbfric.

On the other hand, when the EHC is in the turned-on state (YES in S30), ECU 200 determines in S40 whether or not "exceeding WIN at EHC turned-off time" is predicted.

When the "exceeding WIN at EHC turned-off time" is predicted (YES in S40), ECU 200 performs in S50 the EHC turning-off delay process, and determines in subsequent S60 presence of the "EHC turning-off notice" and determines in S70 presence of the "EHC immediate turning-off request".

When neither "EHC turning-off notice" nor "EHC immediate turning-off request" is given (NO in both S60 and S70), ECU 200 sets in S41 a value obtained by applying the (WIN+Pehc) guard process to regenerative requested brake torque Tpbrq to regeneration performing brake torque Tpb, and sets in S42 a value obtained by subtracting regeneration performing brake torque Tpb from user-requested brake torque Tbkmc (=Tbkmc−Tpb) to hydraulic brake torque Tpbfric. The processes of S41 and S42 are performed also when the "exceeding WIN at EHC turned-off time" is predicted (NO in S40).

When the "EHC turning-off notice" is given (YES in S60), ECU 200 gradually lowers in S61 regeneration performing brake torque Tpb at a change rate less than a predetermined change rate by setting a value obtained by subtracting a predetermined minute amount ΔT from regeneration performing brake torque Tpb of a previous cycle to regeneration performing brake torque Tpb of a present cycle, and gradually increases in S62 hydraulic brake torque Tpbfric depending on lowering of regeneration performing brake torque Tpb by setting hydraulic brake torque Tpbfric to (Tbkmc−Tpb). ECU 200 determines in S63 whether or not the regenerative power is less than battery acceptable power WIN (whether or not regeneration performing brake torque Tpb is less than battery-allowable torque Twin). When the regenerative power is not less than WIN (NO in S63), ECU 200 allows the process to return to S61, and repeats the process of S61 and S62 until the regenerative power becomes less than WIN. The series of processes in S61 to S63 correspond to the first substitute control mentioned above. When the regenerative power becomes less than WIN (YES in S63), the ECU 200 allows the process to proceed to S80.

On the other hand, when the "EHC immediate turning-off request" is given (YES in S70), ECU 200 aborts in S71 the regenerative power generation of second MG 30 by immediately lowering regeneration performing brake torque Tpb to zero, and immediately increases in S72 hydraulic brake torque Tpbfric to user-requested brake torque Tbkmc. The processes of S71 and S72 correspond to the second substitute control described above. After that, ECU 200 allows the process to proceed to S80.

In S80, ECU 200 cancels the EHC turning-off delay. Accordingly, the turning-off of EHC is permitted.

Figure 5:
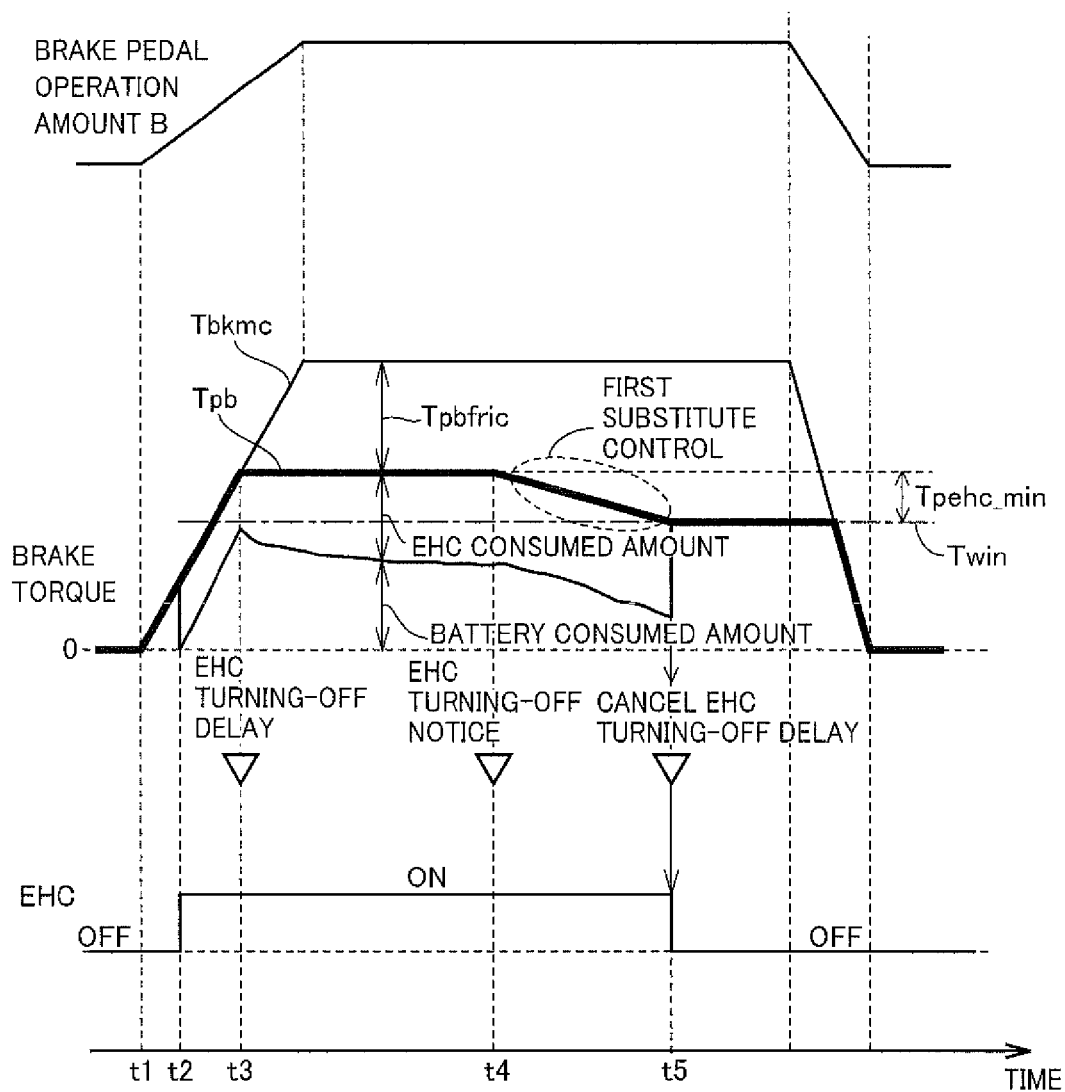
FIG. 5 is a (first) diagram representing a time change in brake torque and a state of EHC.

FIG. 5 is a diagram representing a time change in brake torque and a state of the EHC in the case where the first substitute control is performed.

When user-requested brake torque Tbkmc>0 is given in response to the event that a user starts stepping on a brake pedal at time t1, the regenerative power generation of second MG 30 is started, and regeneration performing brake torque Tpb starts to increase. At this point of time, the EHC is in the turned-off state, thus the regenerative power is supplied to battery 70.

When the EHC is turned on at time t2, the regenerative power is supplied not only to battery 70 but also to EHC 140.

When the exceeding WIN at EHC turned-off time is predicted at time t3, the "EHC turning-off delay" is performed in advance. Until time t4 at which the "EHC turning-off notice" is given, torque of user-requested brake torque Tbkmc by an amount less than (Twin+Tpehc_min) is taken by regeneration performing brake torque Tpb, and remaining torque exceeding (Twin+Tpehc_min) is taken by hydraulic brake torque Tpbfric.

When the "EHC turning-off notice" is given at time t4, the first substitute control is started. In other words, regeneration performing brake torque Tpb is gradually lowered so that the regenerative power becomes less than battery acceptable power WIN, and hydraulic brake torque Tpbfric is gradually increased depending on lowering of regeneration performing brake torque Tpb. Accordingly, the regenerative power can be lowered without giving a sense of discomfort to a user.

When the regenerative power becomes less than battery acceptable power WIN (regeneration performing brake torque Tpb becomes less than battery-allowable torque Twin) at time t5, the "EHC turning-off delay" is cancelled to turn off the EHC. Accordingly, the power consumed in EHC 140 is supplied to battery 70, so that all the regenerative power is supplied to battery 70. However, since the regenerative power is less than battery acceptable power WIN at this point of time, overcharging of the battery is prevented.

Figure 6:
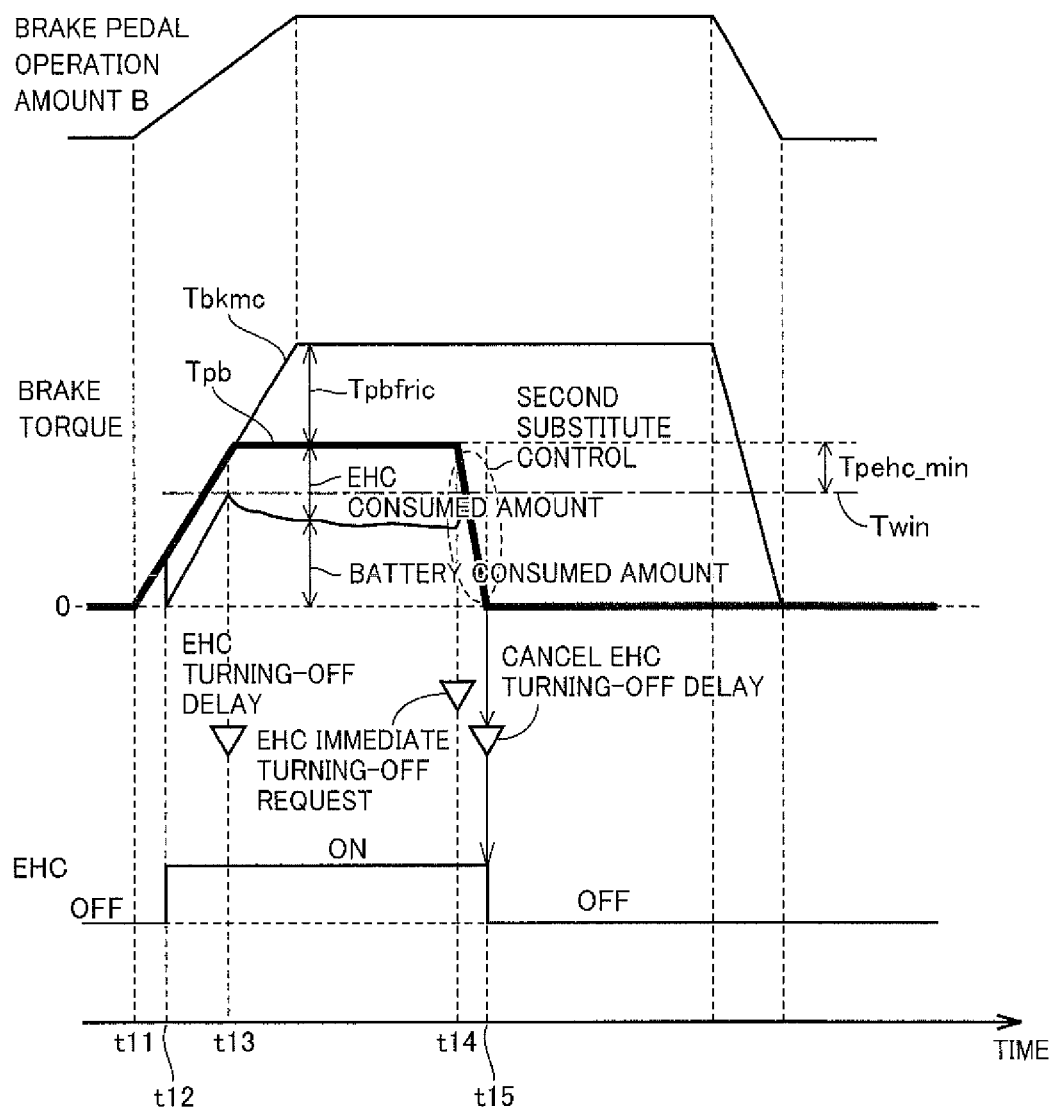
FIG. 6 is a (second) diagram representing a time change in brake torque and a state of EHC.

FIG. 6 is a diagram representing a time change in brake torque and a state of the EHC in the case where the second substitute control is performed.

When user-requested brake torque Tbkmc>0 is given at time t11, the regenerative power generation of second MG 30 is started, so that regeneration performing brake torque Tpb starts to increase.

When the EHC is turned on at time t12, the regenerative power is started to be supplied not only to battery 70 but also to EHC 140. When the "exceeding WIN at EHC turned-off time" is predicted at time t13, the "EHC turning-off delay" is given in advance. Until time t14 at which the "EHC immediate turning-off request" is given, torque of user-requested brake torque Tbkmc by an amount less than (Twin+Tpehc_min) is taken by regeneration performing brake torque Tpb, and the remaining torque exceeding (Twin+Tpehc_min) is taken by hydraulic brake torque Tpbfric.

When the "EHC immediate turning-off request" is given at time t14, the second substitute control is executed. In other words, the regenerative power generation is aborted to immediately lower regeneration performing brake torque Tpb to zero, and hydraulic brake torque Tpbfric is immediately increased to user-requested brake torque Tbkmc. Accordingly, even when such a failure occurs by which power cannot be supplied to EHC 140, overcharging of the battery is suppressed immediately.

The "EHC turning-off delay" is cancelled at time t15 at which the second substitute control is completed, so that the EHC is turned off. At this point of time, since the regenerative power generation has already been aborted, surplus power is not supplied to battery 70 by turning the EHC off.

As described above, in ECU 200 according to the present embodiment, when vehicle 1 performs regenerative braking in the EHC turned-on state (the regenerative power is supplied to both of battery 70 and EHC 140), and the condition for turning the EHC off occurs, the turning-off of the EHC is temporarily delayed, and the hydraulic brake substitutes for the regenerative brake. Then, after the substitution from the regenerative brake to the hydraulic brake is completed, ECU 200 cancels the EHC turning-off delay (permits the turning-off of the EHC). Accordingly, both the suppression of battery overcharging and the suppression of degradation in drivability can be accomplished while effectively utilizing the regenerative power of second MG 30.

It should be understood that the embodiments disclosed herein are illustrative and non-restrictive in every respect. The scope of the present invention is defined by the terms of claims, rather than the description of the embodiments set forth above, and is intended to include any modifications within the scope and meaning equivalent to the terms of claims.

REFERENCE SIGNS LIST 1 vehicle; 2 position sensor; 3 stroke sensor; 10 engine; 20 first MG; 30 second MG; 40 motive power split device; 50 reducer; 60 PCU; 61 converter; 62,63 inverter; 70 battery; 80 drive wheels; 100 switching device; 120 monitoring sensor; 130 exhaust gas passage; 140 EHC; 200 ECH; 210 requested torque calculating unit; 220, 230, 260 determination unit; 250 EHC turning-off delay unit; 270 brake torque controller; 280 EHC turning-off delay cancelling unit; NL1 negative line; NLehc negative branch line; PL1, PL2 positive line; PLehc positive branch line; R1, R2 relay.

The invention claimed is:

1. A vehicle comprising:
a motor coupled to drive wheels;
a power storage device providing and receiving power to and from said motor;
an engine;
a catalyst device, which is heated by power supplied from a power line connecting said motor and said power storage device, for purifying exhaust gas of said engine;
a hydraulic brake device for applying hydraulic brake torque to said drive wheels; and
a control device for controlling said motor and said hydraulic brake device,
when regenerative power generated by regenerative power generation of said motor is supplied to both of said power storage device and said catalyst device, and when a condition for stopping a supply of power to said catalyst device is met, said control device delays stopping of a supply of power to said catalyst device temporarily, substitutes said hydraulic brake torque for at least a part of regenerative brake torque obtained by said regenerative power generation, and permits the stopping of a supply of power to said catalyst device after substitution to said hydraulic brake torque is completed.

2. The vehicle according to claim 1, wherein when a first stopping condition that a temperature of said catalyst device after an elapse of a predetermined time is predicted to exceed an allowable temperature is met during the temporary delay of stopping of the supply of power to said catalyst device, said control device performs a first substitute control of gradually lowering said regenerative brake torque at a change rate less than a predetermined change rate and gradually increasing said hydraulic brake torque depending on lowering of said regenerative brake torque before a supply of power to said catalyst device is stopped.

3. The vehicle according to claim 2, wherein when said regenerative power is supplied to said both of power storage device and catalyst device, and before said first stopping condition is met, said control device controls said regenerative brake torque so that said regenerative power becomes less than a total value of acceptable power of said power storage device and consumed power of said catalyst device, and
said first substitute control is a control of lowering said regenerative brake torque until said regenerative power becomes less than acceptable power of said power storage device and increasing said hydraulic brake torque by a lowered amount of said regenerative brake torque.

4. The vehicle according to claim 1, wherein when a second stopping condition that a supply of power to said catalyst device cannot be performed in a normal way is met during the temporary delay of stopping of the supply of power to said catalyst device, said control device performs a second substitute control of lowering said regenerative brake torque immediately at a change rate higher than or equal to a predetermined change rate and increasing said hydraulic brake torque depending on lowering of said regenerative brake torque.

5. The vehicle according to claim 4, wherein when said regenerative power is supplied to said both of power storage device and catalyst device, and before said second stopping condition is met, said control device controls said regenerative brake torque so that said regenerative power becomes less than a total value of acceptable power of said power storage device and consumed power of said catalyst device, and
said second substitute control is a control of lowering said regenerative brake torque until said regenerative power becomes zero and increasing said hydraulic brake torque by a lowered amount of said regenerative brake torque.

6. The vehicle according to claim 1, wherein when said regenerative power is supplied to said both of power storage device and catalyst device, and before said condition for stopping the supply of power to said catalyst device is met, said control device determines distribution of said regenerative brake torque and said hydraulic brake torque based on acceptable power of said power storage device and consumed power of said catalyst device.

7. The vehicle according to claim 6, wherein said control device determines said regenerative brake torque so that said regenerative power becomes less than or equal to a total value of acceptable power of said power storage device and consumed power of said catalyst device, and said control device sets a torque exceeding said regenerative brake torque in the user-requested brake torque as said hydraulic brake torque.

8. A control method for a vehicle,
said vehicle including:
a motor coupled to drive wheels;
a power storage device providing and receiving power to and from said motor;
an engine;
a catalyst device, which is heated by power supplied from a power line connecting said motor and said power storage device, for purifying exhaust gas of said engine;
a hydraulic brake device for applying hydraulic brake torque to said drive wheels; and
a control device for controlling said motor and said hydraulic brake device,
said control method comprising the steps of:
determining whether or not regenerative power generated by regenerative power generation of said motor is supplied to both of said power storage device and said catalyst device; and
when said regenerative power is supplied to said both of power storage device and catalyst device, and when a condition for stopping a supply of power to said catalyst device is met, delaying stopping of a supply of power to said catalyst device temporarily, substituting said hydraulic brake torque for at least a part of regenerative brake torque obtained by said regenerative power generation, and permitting the stopping of a supply of power to said catalyst device after substitution to said hydraulic brake torque is completed.

* * * * *